United States Patent [19]
Choi

[11] Patent Number: 5,617,386
[45] Date of Patent: Apr. 1, 1997

[54] CD PLAYER FOR REPRODUCING SIGNALS FROM CD-OK AND VIDEO CD

[75] Inventor: Hae-Min Choi, Suwon, Rep. of Korea

[73] Assignee: Samsung Electronics Co., Ltd., Kyungki-do, Rep. of Korea

[21] Appl. No.: 674,451

[22] Filed: Jul. 1, 1996

[30] Foreign Application Priority Data

Jul. 31, 1995 [KR] Rep. of Korea ...................... 95-23527

[51] Int. Cl.$^6$ ............................... G11B 17/22; H04N 5/76
[52] U.S. Cl. .................................. 369/32; 369/58; 369/8; 386/1
[58] Field of Search .................................. 369/32, 33, 54, 369/58, 48, 49, 14, 59; 358/335, 341, 342, 343

[56] References Cited

U.S. PATENT DOCUMENTS 5,528,570  6/1996  Jondo ......................................... 369/48
5,535,008  7/1996  Yamagishi et al. ...................... 358/342

Primary Examiner—Tan Dinh
Attorney, Agent, or Firm—Sughrue, Mion, Zinn, Macpeak & Seas

[57] ABSTRACT

A CD player for reproducing signals stored on CD-OK and video compact disks (VCD) includes a first controller for controlling CD-OK reproduction; a second controller for outputting audio and video data for CD-OK reproduction and a control signal for VCD reproduction; a decoder for restoring compressed video and audio data; a first storage for storing control data for processing CD-OK signals during CD-OK reproduction and for storing control data for processing VCD during VCD reproduction; a second storage for storing data for a still screen and superposed data of the CD-OK disk during CD-OK reproduction and for storing video and audio data during VCD reproduction; a first digital-to-analog converter for converting the CD-OK video data output from the second controller into an analog image signal; a second digital-to-analog converter for converting image data output from the decoder into an analog image signal; a first switch for selecting one of the image signals output from one of the digital-to-analog converters; a video encoder for converting the image signal output from the first switch into a composite image signal; and a second switch for selecting an audio output, thus integrating CD-OK and VCD reproduction circuits to reduce manufacturing costs for an integrated system.

6 Claims, 3 Drawing Sheets

CD PLAYER FOR REPRODUCING SIGNALS FROM CD-OK AND VIDEO CD

BACKGROUND OF THE INVENTION

1. Field of the Invention

The present invention relates to a compact disc (CD) player, and more particularly, to a CD player capable of reproducing signals stored on a CD-OK disk and a video CD.

A CD-OK system reproduces an accompaniment signal, lyrics and background screen for a song which is selected from a compact disc. Typically, the disc can store data (accompaniment and lyrics) for approximately 7,000 songs and approximately 4,000 still images.

FIG. 1 is a block diagram showing the construction of a conventional CD-OK system.

The apparatus shown in FIG. 1 is provided with a system/video controller 108 for generating an address, a sync signal and various control signals necessary for restoring the video data of a CD-OK system; a microcomputer 102 for controlling the system/video controller 108; a program read-only memory (ROM) 100 for storing programs necessary for operating the microcomputer 102; a buffer random access memory (RAM) 104 for temporarily storing data used for the microcomputer; a video RAM 110 for storing image data output from the system/video controller 108; a digital-to-analog converter 112 for converting still image data output from the system/video controller 108 into an RGB signal; a video encoder 116 for converting the RGB signal received from the digital-to-analog converter 112 into a composite image signal according to the address and sync signals supplied from the system/video controller 108 and for outputting the composite image signal; a sound source module 106 for receiving musical instrument digital interface (MIDI) data from a disc (not shown) and thereby generating a CD-OK audio signal; and a switch 118 for selecting either the audio data signal of an external CD, converted via a digital-to-analog converter 120, or the CD-OK audio output from the sound source module 106, and for outputting the selected signal.

A video CD system can reproduce a digital moving picture and digital sound by using a disc storing an image and sound data compressed according to the Moving Picture Experts Group (MPEG) standard.

FIG. 2 is a block diagram showing the construction of a conventional video CD system.

The apparatus shown in FIG. 2 is provided with an MPEG decoder 212 for processing a compressed video signal and a compressed audio signal necessary for video CD operation; a microcomputer 218 for controlling the MPEG decoder 212; a buffer RAM 216 for temporarily storing data which will be used in the microcomputer 218; a micro code ROM 210 for storing programs necessary for operation of the MPEG decoder 212; a video RAM 214 for storing image data of the MPEG decoder 212; a digital-to-analog converter 220 for converting the digital image signal output from the MPEG decoder 212 into an RGB image signal; a video encoder 224 for converting the RGB signal output from the digital-to-analog converter 220 into a composite image signal; and a digital-to-analog converter 226 for converting the digital audio signal output from the MPEG decoder 212 into an analog audio signal and for outputting the converted analog audio signal.

With the above conventional arrangements, the CD-OK and video CD systems require different circuits. Accordingly, when they are integrated into a combined apparatus, the manufacturing cost of the integrated apparatus incorporates a large portion of the costs for each individual device. In addition, the integrated device occupies a large amount of space.

SUMMARY OF THE INVENTION

Accordingly, it is an object of the present invention to reduce the manufacturing costs of an integrated CD player by providing a compact disc (CD) player for reproducing signals from both a CD-OK disk and a video CD, in which the microcomputers, memories and video encoder circuitry for the CD-OK system and a video CD system are integrated.

To accomplish this object, there is provided a compact disc (CD) player for reproducing signals from a CD-OK disk and a video CD, comprising: a first controller for generating a first control signal for the signal reproduction of the CD-OK disk and controlling a compressed signal during reproduction of the video(s); a second controller for outputting audio and video data for reproduction of the CD-OK disk according to said first control signal received from the first controller and for outputting a second control signal for reproduction of the video CD; a compressed signal decoding portion, responsive to said second control signal, for restoring compressed video data and compressed audio data received during the video CD reproduction, into decompressed video data and audio data, respectively; a first memory for storing control data of the CD-OK disk and data for the first controller during the CD-OK reproduction and for storing control data of the video CD and data of the first controller during the video CD reproduction; a second memory, accessed by said second control portion, for storing data for a still screen and superposed data of the CD-OK disk during the CD-OK reproduction and for storing the compressed video and audio data during the video CD reproduction; a first digital-to-analog converter for converting the CD-OK video data output from the second controller into an analog RGB image signal; a second digital-to-analog converter for converting image data output from the compressed signal decoding portion into an analog RGB image signal; a first switch for selecting one of the RGB image signals output from one of the first and second digital-to-analog converters, according to a selection signal from the second controller; a video encoder for converting the RGB image signal output from the first switch into a composite image signal and for outputting the converted signal; and a second switch for selecting one of the video CD audio signal output from the compressed signal decoding portion and the CD-OK audio signal output from the second controller, and for outputting the result.

BRIEF DESCRIPTION OF THE DRAWINGS

The above object and advantages of the present invention will become more apparent by a detailed description of a preferred embodiment thereof with reference to the attached drawings in which.

DETAILED DESCRIPTION OF THE INVENTION

Figure 1:
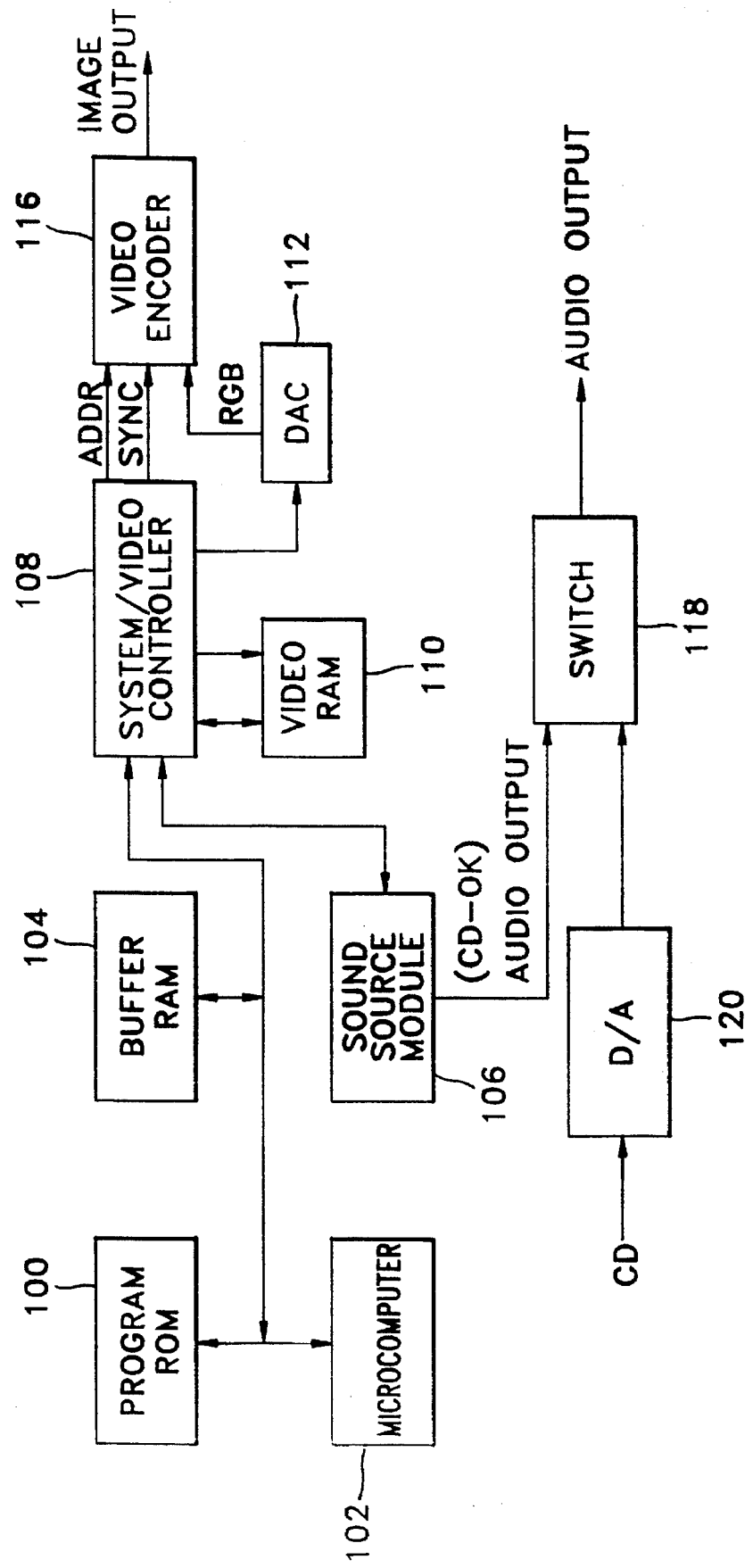
FIG. 1 is a block diagram showing the construction of a conventional CD-OK system.
Figure 2:
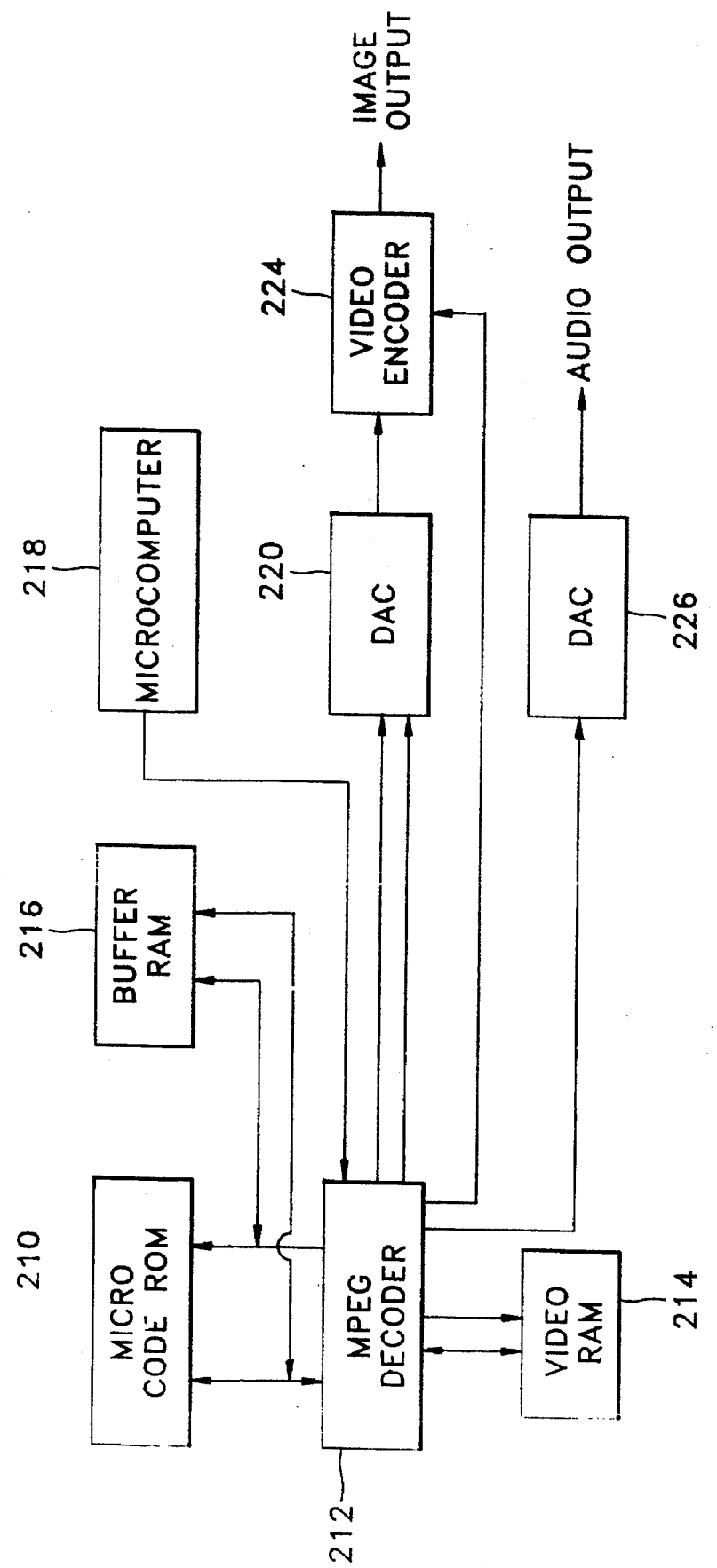
FIG. 2 is a block diagram showing the construction of a conventional video CD system.
Figure 3:
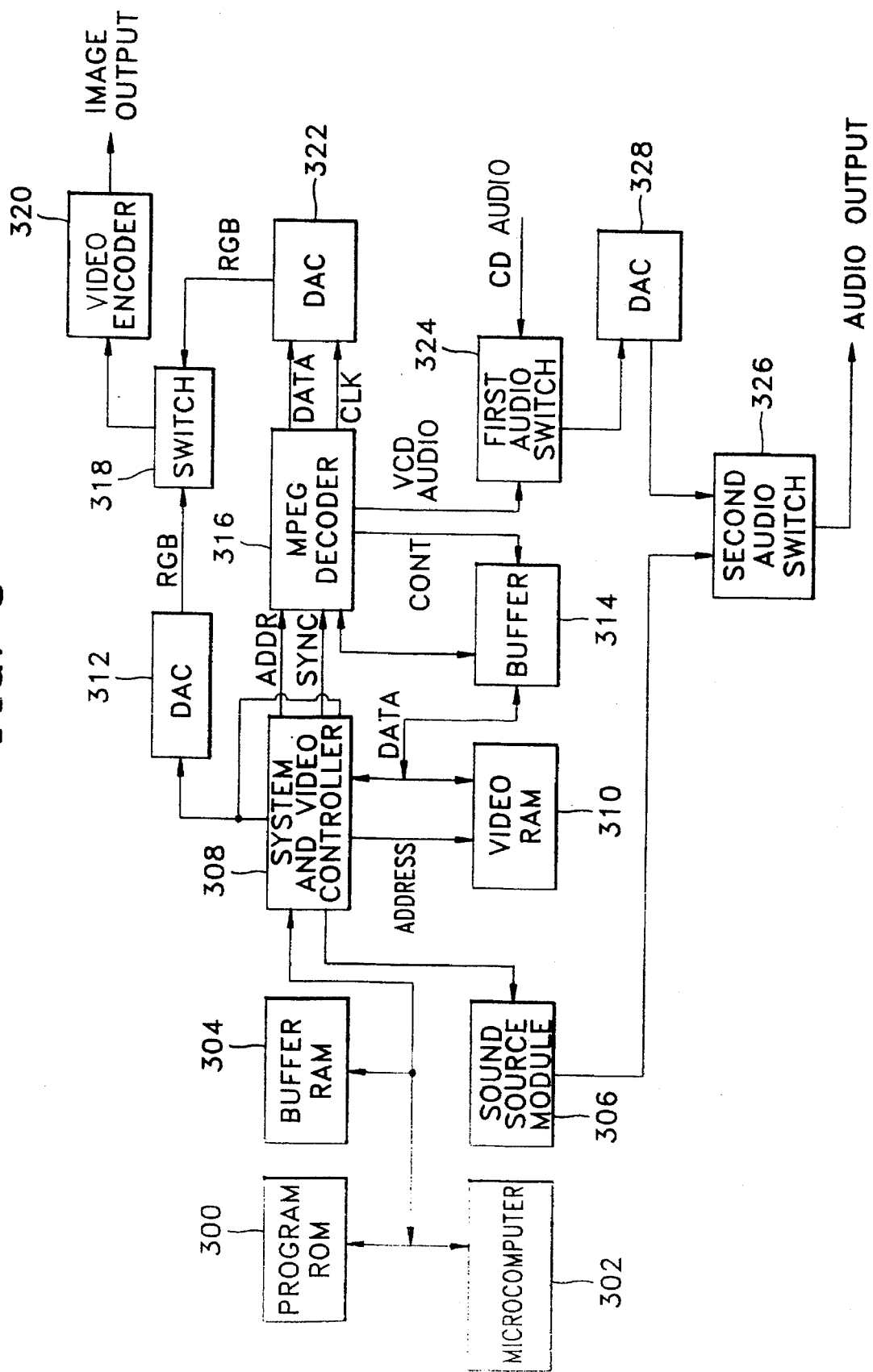
FIG. 3 is a block diagram showing the CD player according to a preferred embodiment of the present invention.

The apparatus shown in FIG. 3 comprises a system and video controller 308 for generating an address, a sync signal and various control signals necessary for restoring the video data of a CD-OK system; a microcomputer 302 for controlling the system and video controller 308; a program ROM 300 for storing a program necessary for operating the microcomputer 302 and a program necessary for operating the MPEG decoder 316; a buffer RAM 304 for temporarily storing data used by the microcomputer 302; a video RAM 310 for storing image data according to the address generated by the system and video controller 308; a first digital-to-analog converter 312 for converting still image data output from the system and video controller 308 into an RGB image signal; an MPEG decoder 316 for decoding a compressed video signal and a compressed audio signal by the address and the synchronizing signal output from the system and video controller 308; a buffer 314 for storing data necessary for operation of the MPEG decoder 316; a second digital-to-analog converter 322 for converting the decoded digital image data output from the MPEG decoder 316 into the RGB image signal according to a clock signal; a video switch 318 for selecting RGB image signals output from one of the first and second digital-to-analog converters 312 and 322; a video encoder 320 for converting the RGB image signal output from the video switch 318 into a composite image signal; a sound source module 306 for generating a CD-OK audio signal according to transmitted MIDI data, a first audio switch 324 for selecting either a video CD audio signal output from the MPEG decoder 316 or an audio signal output from an external compact disc; a third digital-to-analog converter 328 for converting the audio signal selected by the first audio switch 324 into an analog audio signal; and a second audio switch 326 for selecting either the CD-OK audio signal output from the sound source module 306 or the audio signal output from the third digital-to-analog converter 328.

In addition, the CD-OK and video CD signals, reproduced in a compact disc reproduction portion (not shown), are output to the microcomputer 302 and MPEG decoder 316, respectively.

The system and video controller 308 selects a chip necessary for system operation and processes video data and audio data of the CD-OK disk by control signals of the microcomputer 302, and the MPEG decoder 316 processes the compressed video and audio data of the video CD. Here, the microcomputer 302 stores programs and data necessary for operation of itself and the MPEG 316 in the program ROM 300 and the buffer RAM 304.

During reproduction of data from the CD-OK disk, the system and video controller 308 generates an address under the control of the microcomputer 302, and the received still image data is stored in the video RAM 310 of a CD-OK data region. The video data stored in the video RAM 310 is transmitted to the digital-to-analog converter 312, which consists mainly of resistors, and is converted into an analog RGB image signal.

During reproduction of the video CD, the system and video controller 308 generates and outputs an address to the video RAM 310 by a video RAM address multiplier (not shown). A data bus from the MPEG decoder 316 is connected to the video RAM 310 through the bi-directional buffer 314 so that the MPEG decoder 316 can also use the video RAM 310. The restored (decompressed) video data is stored in the video RAM 310 of the video CD data region according to the address supplied by the system and video controller 308. The stored data is output to the MPEG decoder 316 via the buffer 314 according to the address and the sync signal supplied by the system and video controller 308.

The MPEG decoder 316 restores the compressed image data. The image data output from the MPEG decoder 316 is converted into a RGB image signal by the digital-to-analog converter 322 and the converted data is output to the video switch 318.

The video switch 318 selects either the RGB image signal output from the digital-to-analog converter 312 for reproducing data from the CD-OK disk, or the RGB image signal from the digital-to-analog converter 322 for reproducing data from the video CD. The selected RGB image signal is converted into a composite image signal by the video encoder 320 for display.

During CD-OK reproduction, the received MIDI data is output to the sound source module 306, for storing the sound source, by the system and video controller 308 to be converted into a CD-OK audio signal and for output. During reproduction of the video CD, the received compressed audio data is stored in the video RAM 310 by the MPEG decoder 316, and the compressed audio data stored in the video RAM 310 is restored to a video CD audio signal through the MPEG decoder 316.

The first audio switch 324 selects either video CD audio data or the CD audio data received from the external CD reproduction portion (not shown), and the selected audio data is converted into an analog audio signal by the digital-to-analog converter 328.

The second audio switch 326 selects either the audio signal output from the video compact disk or the audio signal output from the CD-OK disk.

In the manner described above, the microcomputer 302, program ROM 300, buffer RAM 304, video RAM 310 and video encoder 320 are included within a combined apparatus for reproducing signals stored on either CD-OKs and video CDs. The video RAM 310 responds to the address supplied by the system and video controller 308 and can select either the memory region of the CD-OK disk or the memory region of the video compact disk.

According to the above-described present invention, elements for reproducing CD-OK and video CD signals are combined, thus reducing manufacturing costs for an integrated system.

What is claimed is:

1. A compact disc (CD) player for reproducing signals from a CD-OK disk and a video CD, comprising:

a first controller for generating a first control signal for signal reproduction of said CD-OK disk;

a second controller for outputting audio and video data for reproduction of said CD-OK disk according to said first control signal received from said first controller and for outputting a second control signal for signal reproduction of said video CD;

a compressed signal decoding portion, responsive to said second control signal, for restoring compressed video data and compressed audio data received during said video CD reproduction, into decompressed video data and audio data, respectively;

a first memory for storing control data of said CD-OK disk and data for said first controller during said CD-OK reproduction and for storing control data of said video CD and data for said first controller during said video CD reproduction;

a second memory, accessed by said second controller, for storing data for a still screen and superposed data of said CD-OK disk during said CD-OK reproduction and for storing said compressed video and audio data during said video CD reproduction;

a first digital-to-analog converter for converting the CD-OK video data output from said second controller into an analog RGB image signal;

a second digital-to-analog converter for converting image data output from said compressed signal decoding portion into an analog RGB image signal;

a first switch for selecting one of the RGB image signals output from one of said first and second digital-to-analog converters, according to a selection signal from said second controller;

a video encoder for converting the RGB image signal output from said first switch into a composite image signal and for outputting the converted signal; and a second switch for selecting one of the video CD audio signal output from said compressed signal decoding portion and the CD-OK audio signal output from said second controller, and for outputting the result.

2. The CD player according to claim 1 further comprising:

a buffer means connected between said compressed signal decoding portion and said second memory for providing access to said second memory by said compressed signal decoding portion.

3. A compact disc (CD) player for reproducing signals from a CD-OK disk and a video CD, comprising:

a first controller for generating a first control signal for signal reproduction of said CD-OK disk;

a second controller for outputting audio and video data for reproduction of said CD-OK disk according to said first control signal received from said first controller and for outputting a second control signal for signal reproduction of said video CD;

a compressed signal decoding portion, responsive to said second control signal, for restoring compressed video data and compressed audio data received during said video CD reproduction, into decompressed video data and audio data, respectively;

a first memory for storing control data of said CD-OK disk and data for said first controller during said CD-OK reproduction and for storing control data of said video CD and data for said first controller during said video CD reproduction;

a second memory, accessed by said second controller, for storing data for a still screen and superposed data of said CD-OK disk during said CD-OK reproduction and for storing said compressed video and audio data during said video CD reproduction;

a first digital-to-analog converter for converting the CD-OK video data output from said second controller into an analog RGB image signal;

a second digital-to-analog converter for converting image data output from said compressed signal decoding portion into an analog RGB image signal;

a first switch for selecting one of the RGB image signals output from one of said first and second digital-to-analog converters, according to a selection signal from said second controller;

a video encoder for converting the RGB image signal output from said first switch into a composite image signal and for outputting the converted signal; and a second switch for selecting one of an audio signal from an external CD and the video CD audio signal output from said compressed signal decoding portion;

a third digital-to-analog converter for converting the selected output from said second switch; and a third switch for selecting one of the output of said third digital-to-analog converter and the CD-OK audio signal output from said second controller.

4. The CD player according to claim 3 further comprising:

a buffer means connected between said compressed signal decoding portion and said second memory for providing access to said second memory by said compressed signal decoding portion.

5. A compact disc (CD) player for reproducing signals from a CD-OK disk and a video CD, comprising:

a first controller for generating a first control signal for signal reproduction of said CD-OK disk;

a second controller for outputting audio and video data for reproduction of said CD-OK disk according to said first control signal received from said first controller and for outputting a second control signal for signal reproduction of said video CD;

a compressed signal decoding portion, responsive to said second control signal, for restoring compressed video data and compressed audio data received during said video CD reproduction, into decompressed video data and audio data, respectively;

a first memory for storing control data of said CD-OK disk and data for said first controller during said CD-OK reproduction and for storing control data of said video CD and data for said first controller during said video CD reproduction;

a second memory, accessed by said second controller, for storing data for a still screen and superposed data of said CD-OK disk during said CD-OK reproduction and for storing said compressed video and audio data during said video CD reproduction;

a first digital-to-analog converter for converting the CD-OK video data output from said second controller into an analog RGB image signal;

a second digital-to-analog converter for converting image data output from said compressed signal decoding portion into an analog RGB image signal;

a sound source portion for processing the CD-OK audio data output from said second controller to produce a sound reproduction signal;

a first switch for selecting one of the RGB image signals output from one of said first and second digital-to-analog converters, according to a selection signal from said second controller;

a video encoder for converting the RGB image signal output from said first switch into a composite image signal and for outputting the converted signal; and a second switch for selecting one of the video CD audio signal output from said compressed signal decoding portion and the sound reproduction signal output from said sound source portion and for outputting the selected signal.

6. The CD player according to claim 5 further comprising:

a buffer means connected between said compressed signal decoding portion and said second memory for providing access to said second memory by said compressed signal decoding portion.

* * * * *